United States Patent [19]

Schoon

[11] Patent Number: 5,319,011
[45] Date of Patent: Jun. 7, 1994

[54] COMPOSITIONS AND METHOD FOR CATALYTIC CURING OF CYANOACRYLATE POLYMERS

[75] Inventor: Douglas D. Schoon, Newport Beach, Calif.

[73] Assignee: Creative Nail Design, Inc., Carlsbad, Calif.

[21] Appl. No.: 905,902

[22] Filed: Jun. 29, 1992

Related U.S. Application Data

[63] Continuation-in-part of Ser. No. 486,527, Feb. 28, 1990, abandoned.

[51] Int. Cl.$^5$ ............... C09D 133/14; A61K 7/043; C08F 18/22
[52] U.S. Cl. ................... 524/261; 524/533; 424/61; 526/190; 526/298
[58] Field of Search ............ 526/190, 298; 524/261, 524/533; 424/61

[56] References Cited

U.S. PATENT DOCUMENTS

| | | | |
|---|---|---|---|
| 3,216,983 | 11/1965 | Shelanski et al. | 260/88.3 |
| 3,382,223 | 5/1968 | Borsini et al. | 526/344.2 |
| 3,390,143 | 6/1968 | Nicora | 526/344.2 |
| 3,478,756 | 11/1969 | Sautter et al. | 132/73 |
| 3,483,289 | 12/1969 | Michaelson et al. | 424/61 |
| 3,711,576 | 1/1973 | Hwa | 525/213 |
| 4,058,442 | 11/1977 | Lee, Jr. et al. | 424/61 |
| 4,126,144 | 11/1978 | Duarte | 132/73 |
| 4,229,431 | 10/1980 | Lee, Jr. et al. | 424/61 |
| 4,260,701 | 4/1981 | Lee, Jr. | 525/303 |
| 4,417,034 | 11/1983 | Webster | 526/190 |
| 4,450,848 | 5/1984 | Ferrigno | 132/73 |
| 4,587,321 | 5/1986 | Sebag et al. | 528/27 |
| 4,590,070 | 5/1986 | Deckner et al. | 424/70 |
| 4,596,260 | 6/1986 | Giuliano | 132/73 |
| 4,682,612 | 7/1987 | Giuliano | 132/73 |
| 4,690,369 | 9/1987 | Giuliano | 249/55 |
| 4,724,177 | 2/1988 | Russo | 428/35 |

FOREIGN PATENT DOCUMENTS 2107186 4/1983 United Kingdom.
2113245 8/1983 United Kingdom.
2114580 8/1983 United Kingdom.

OTHER PUBLICATIONS

S. M. Walas "Reaction Kinetics for Chemical Engineers," pp. 149-150, McGraw Hill, New York, 1959.
A. A. Frost and R. G. Pearson, "Kinetics and Mechanism," wnd Ed., Wiley, New York, 1961, pp. 211-212.
T. W. G. Solomons, "Organic Chemistry," 2nd Ed., Wiley, 1980, pp. 228-230.
Parkins et al. *An Introduction to Organometallic Chemistry,* Section 8.1.7 pp. 182-185 (1986).
Seymour, *Engineering Polymer Sourcebook,* Ch. 8, pp. 131-142 (1990).
Coover, "Cyanoacrylate Adhesives", Ch. 31, pp. 409-414 in Skeist ed. *Handbook of Adhesives* (1962).
Haiduc et al., *Basic Organometallic Chemistry,* Section 8.3, pp. 153-173 (1985).
Millet, "Cyranoacrylate Adhesives", Ch. 6, pp. 249-307 in Hartshorn ed., Structural Adhesives: *Chemistry and Technology* (1986).

*Primary Examiner*—Joseph L. Schofer
*Assistant Examiner*—Mark Nagumo
*Attorney, Agent, or Firm*—Brown, Martin, Haller & McClain

[57] ABSTRACT

A method is disclosed for the catalytic polymerization of cyanoacrylate monomers by contacting said monomers with an organotin compound. Also included is a polymerizable system comprising cyanoacrylate monomer and an organotin compound, wherein upon contact of the monomer and the compound, the compound catalyzes the polymerization of the monomer. The organotin compound will have the formula $R_3SnX$ (I), where each R is alkyl, cycloalkyl, alkaryl or aryl and X is alkyl, cycloalkyl, aryl, alkaryl, hydrogen, hydroxide or alkylcarboxyl, or the formula $R_2R'_sSn$ (II), where each R is alkyl and each R' is alkyl, cycloalkyl, aryl, hydrogen, hydroxide or alkylcarboxyl. In each compound all substituents of the same chemical type may be the same species or two or more may be different species from each other, provided, however, that if in compound II both R and R' are of the same chemical type, each of the R substituents must be a different species from each of the R' substituents. The compounds may also be reacted or complexed with sulfur compounds, such as mercapto acid salts or mercaptides. Preferably R, R' and X are all $C_1$-$C_{18}$ alkyl, more preferably normal alkyl.

41 Claims, No Drawings

COMPOSITIONS AND METHOD FOR CATALYTIC CURING OF CYANOACRYLATE POLYMERS

CROSS-REFERENCE TO RELATED APPLICATION

This application is a continuation-in-part of application Ser. No. 07/486,527, filed Feb. 28, 1990, now abandoned.

BACKGROUND OF THE INVENTION

1. Field of the Invention

The invention herein relates to catalytic polymerization methods and polymerization catalysts. More particularly, it relates to the polymerization of cyanoacrylate monomers.

2. Description of the Prior Art

The cyanoacrylate polymers are well known, especially for their adhesive properties. Their chemistry, methods of formation, compositions and uses are detailed widely; see, for example, Millet, "Cyanoacrylate Adhesives," Ch. 6, pp. 249–307, in Hartshorn, ed., *Structural Adhesives: Chemistry and Technology* (1986); Seymour, *Engineering Polymer Sourcebook*, Ch. 8, pp. 131–142 (1989); and Coover, "Cyanoacrylate Adhesives," Ch. 31, pp. 409–414, in Skeist, ed., *Handbook of Adhesives* (1962).

When used in the form of thin films, some cyanoacrylate monomers polymerize very rapidly in the presence of moisture. For these polymers, the amount of moisture in surrounding air is sufficient to cause complete polymerization of a thin film of the cyanoacrylate monomer, thus leading to the wide use of such cyanoacrylates as adhesives for bonding of tightly fitting surfaces. However, many of these polymers, when in the form of thin films, lack flexibility, color stability or film strength. Other cyanoacrylate monomers polymerize only slowly in the presence of ambient moisture. In addition, many cyanoacrylate monomers (including those that otherwise would polymerize rapidly in the presence of ambient moisture) are initially mixed with inhibitors intended to prolong shelf life, which has the detrimental side effect that desirable polymerization speed is substantially slowed. There is thus a need for a catalyst that would speed the thin film polymerization of the normally slow cyanoacrylate monomers, overcome the retarding effects of inhibitors mixed with other cyanoacrylate monomers, and provide flexibility, color stability and/or strength to thin cyanoacrylate polymer films.

Further, when present in a thicker layer (i.e., in "bulk"), most cyanoacrylate monomers do not polymerize well. Polymerization in bulk is usually incomplete and the presence of unreacted monomer is detrimental to the properties of the polymerized product. It is believed that the polymerization of the bulk material is incomplete because the ambient moisture which catalyzes the thin film polymerization cannot penetrate satisfactorily into the body of the thicker layers of the cyanoacrylate monomer, and even that amount of moisture which does penetrate does not act effectively as a catalyst.

This is of particular significance in the adhesive field. As noted above, the cyanoacrylates in thin films usually form excellent bonds with nylons, polystyrenes, polyesters, polyacetals, metals, glass and non-porous ceramics, woods and similar materials. However, in the thicker layers, such bonds do not form properly and the adhesion is weak or non-existent. Thus it has been difficult to produce "gap filling" cyanoacrylate adhesives, i.e., those adhesives which will bond tightly even where the opposing faces of the objects to be adhered do not mate precisely.

To this end there have been suggestions of a number of additive materials which can be incorporated into the cyanoacrylate monomer composition in an attempt to catalyze bulk polymerization fully and to provide for "gap filling." Some of the additives have been in the form of polymerization initiators but these are not usually satisfactory since they do not provide for shelf life prior to use. Another group of additives which has been suggested are promoters, which rely on separate initiation of polymerization by a third component. While such promoters can be blended with the cyanoacrylate monomers without causing any reaction, there is still the necessity of having a separate initiator before the polymerization promoters become effective. In addition, there have been compositions in which fillers are added to provide intermediate surfaces to help form extended films to "bridge the gap" between irregular mating opposed faces, but such fillers do not appreciably aid in the bonding and provide foreign material (and occasionally discoloration) to the bonded region.

While a number of the additives have been effective for completing or accelerating polymerization, they present problems which can prevent their full utilization. First, many of the catalytic reactions which result generate severe exotherms and cause the polymerized cyanoacrylate material to become overheated. The presence of such excess heat can deteriorate the polymer bonds, discolor the polymerized body and detrimentally affect other additive materials which may be present in the composition or the surfaces with which the cyanoacrylate polymer is in contact. For instance, when cyanoacrylate polymers are used as a surface coating for natural human fingernails or as part of nail preparation compositions which are used to enhance the physical properties and appearance of human fingernails, the exothermic reaction which occurs can not only discolor the decorative nail surface but can often be of sufficient magnitude that the person's nails and in some cases even the underlying tissue are seriously harmed by the heat. Of course even where there is no actual burning or blistering of the nails or tissue, the person usually experiences a great deal of discomfort from the heat. As a similar example, the bonding of transparent or translucent sheets of plastic materials is detrimentally affected if the exotherm is sufficient to scorch or discolor the bonded surfaces.

It has also been found that many of the catalyst compositions are toxic, either when inhaled as fumes or when placed in contact with the human skin. Again considering nail compositions, a volatile toxic catalyst can be inhaled by both the wearer of the nail compositions and by the beautician or other person who applies the compositions. Both also can absorb the material through the skin, either by directly touching the composition while it is being applied to the wearer's nails or by absorption of fumes through the various skin surfaces which are in contact with the ambient air. The same will of course be true for other user of the material, whether is it being used to catalyze cyanoacrylate adhesives or other surface coatings.

Finally, many of the proposed catalytic materials react only fairly slowly and do not provide quick polymerization of the slow or bulk cyanoacrylate monomers. This requires that such compositions must be set in place for some time before the cyanoacrylate monomer is fully polymerized. In many cases this is difficult or disadvantageous.

Organotin compounds have been disclosed in the prior art as catalysts for vinyl halide polymerization in combination with an oxidizing agent; see related U.S. Pat. Nos. 3,382,223 and 3,390,143. Polymerization was conducted under cryogenic conditions (−40° C.) but at room temperature (+30° C.) there was no polymerization reaction.

It would, therefore, be of great value to have a catalytic system which would allow for complete and rapid polymerization of cyanoacrylate monomers in bulk (i.e non-thin-film) form so that the polymerization would be complete throughout the polymerized body, that would accelerate the polymerization of "slow" thin film cyanoacrylate monomers, that could be used to overcome the retarding effects of inhibitors and that would provide flexibility, color stability and/or strength to thin cyanoacrylate polymer films. Such a system would also advantageously operate without the presence of any significant exotherm; would be reactive at ambient temperatures; would not tend to discolor or distort the polymerized body; and would not cause harm to any adjoining material, whether human tissue or nails or any other type of material with which the cyanoacrylate compositions may be in contact. Further, the catalyst itself should be readily available, satisfactory for use in either direct or indirect contact with people and of sufficiently low toxicity to be suitable for prolonged use by and in the presence of people, particularly where such compositions are to be applied directly to the human body (such as nail dressings), in which case they must also be acceptable for use under appropriate public health and cosmetics laws.

SUMMARY OF THE INVENTION

In its broadest aspect, the invention herein is a method for the catalytic polymerization of cyanoacrylate monomers which comprises contacting said monomers with an organotin compound. Generally the organotin compound will have the formula $R_3SnX$ (I), where each R is alkyl, cycloalkyl, alkaryl or aryl and X is alkyl, cycloalkyl, aryl, alkaryl, hydrogen, hydroxide or alkylcarboxyl, or the formula $R_2R'_2Sn$ (II), where each R is alkyl and each R' is alkyl, cycloalkyl, aryl, alkaryl, hydrogen, hydroxide or alkylcarboxyl. In each compound all substituents of the same chemical type may be the same species or two or more may be different species from each other, provided, however, that if in compound II both R and R' are of the same chemical type, each of the R substituents must be a different species from each of the R' substituents. The compounds may also be reacted or complexed with sulfur compounds, such as mercapto acid salts or mercaptides. Preferably R, R' and X are all $C_1$-$C_{18}$ alkyl, more preferably normal alkyl. In more preferred embodiments, compound I will be a tetraalkyl compound with all alkyl substituents being the same species and compound II will be a dialkyl compound, with both R substituents being the same n-$C_1$-$C_8$ alkyl species and both R' substituents being the same n-$C_9$-$C_{18}$ alkyl species.

DETAILED DESCRIPTION AND PREFERRED EMBODIMENTS

The crux of the present invention lies in the discovery that organotin compounds surprisingly provide a unique class of cyanoacrylate monomer catalysts which serve to fully polymerize the monomer very rapidly and without any significant exotherm, and which have a significantly lower degree of toxicity than any of the currently used bulk catalysts. The organotin catalysts serve not only to cause rapid and thorough polymerization in bulk, but also overcome the effects of inhibitors, speed the polymerization of retarded or normally slow polymerizing monomers, and provide flexibility, color stability and/or strength to thin cyanoacrylate polymer films. While there have been quite a number of different catalysts suggested in the art (as described above) it is believed that until the present discovery there was no recognition that the organotin compounds could be used in the present capacity.

The chemistry and structure of organotin compounds are described in Haiduc et al., *Basic Organometallic Chemistry*, § 8.3, pp 153-173 (1985) and Parkins et al., *An Introduction to Organometallic Chemistry*, § 8.1.7, pp. 182-185 (1986). Those organotin compounds most useful in this invention will have the formula $R_3SnX$ (I), where each R is alkyl, cycloalkyl, alkaryl or aryl and X is alkyl, cycloalkyl, aryl, alkaryl, hydrogen, hydroxide or alkylcarboxyl, or the formula $R_2R'_2Sn$ (II), where each R is alkyl and each R' is alkyl, cycloalkyl, aryl, alkaryl, hydrogen, hydroxide or alkylcarboxyl. In each compound all substituents of the same chemical type may be the same species or two or more may be different species from each other, provided, however, that if in compound II both R and R' are of the same chemical type, each of the R substituents must be a different species from each of the R' substituents. The compounds may also be reacted or complexed with sulfur compounds, such as mercapto acid salts or mercaptides. Preferably R, R' and X are all $C_1$-$C_{18}$ alkyl, more preferably normal alkyl. In more preferred embodiments, compound I will be a tetraalkyl compound with all alkyl substituents being the same species (e.g., tetraoctyl tin) and compound II will be a dialkyl compound, with both R substituents being the same n-$C_1$-$C_8$ alkyl species and both R' substituent being the same n-$C_9$-$C_{18}$ alkyl species (e.g., dibutyl dilauryl tin [also known as dibutyl tin dilaurate]). There will, however, be many other alkyl compounds which may be used; compounds which have been found to be successful include stannous octoate, dibutyl tin di(2-ethyl hexoate), dibutyl tin dioctoate, diphenyl dimethyl tin, tribenzyl tin hydroxide, dibutyl tin maleate, divinyl dibutyl tin, and dibutyl tin diacetate. I have also successfully used proprietary organotin compounds believed to be of the formulas set forth above; these include products available commercially from Air Products and Chemicals Corporation under the trade designations "T-131" (stated to be a dialkyl tin dialkyl mercapto acid), "T-120" (stated to be a butyl tin mercaptide) and "T-5" (stated to be a sulfur alkyl organotin complex).

Conversely, however, I have found that organotin acids not containing sulfur and organoacid salts of metals other than tin are not suitable. For instance, two other proprietary products from Air Products and Chemicals Corporation available under the trade designations "T-125" (stated to be a dibutyl tin organic acid) and "T-45" (stated to be a potassium alkyl hexoate salt of an organic acid) did not catalyze the cyanoacrylate polymerization reaction.

The cyanoacrylate monomers which are polymerized by the organotin compounds of the present invention are any of the conventional cyanoacrylates which have been described in the art, particularly those described in the aforesaid Millet reference. These include the methyl, ethyl, isopropyl, n-butyl, and allyl cyanoacrylates. Most of the commercial cyanoacrylates available today are the ethyl and methyl ester monomers. Suitable materials are available from many commercial sources and are sold under a variety of individual trade names and trademarks, a number of which are disclosed in the above-cited Millet reference.

The invention herein is useful for a wide variety of applications. One which has been newly discovered, and which is the subject of a copending patent application, is for the formation of artificial nail coatings and extenders. Other applications include use where thick layers (bulk quantities) of cyanoacrylate monomer must be rapidly and thoroughly polymerized to form hard, clear surfaces having many desired types of properties. These may, for instance, include such uses as protective coatings on glass or plastic sheets or providing smooth layers on otherwise roughened surfaces to permit application of further coatings such as paint. It is also of particular importance in the manufacture of speakers and electronics boards. It can also be useful in areas such as adhesives where the cyanoacrylate adhesive is sufficiently thick that it does not cure thoroughly to provide the sufficient degree of adhesion between the two spaced apart surfaces; it is of particular interest for the production of "gap filing" adhesives. Use of the present invention will cause rapid and complete curing throughout the thicker body of cyanoacrylate monomer and provide the requisite degree of adhesion (even where the opposed surfaces are not precisely aligned), which can be anticipated to be generally equivalent to that provided by some thin film cyanoacrylate adhesives. Further, with those thin film cyanoacrylates which do not normally cure sufficiently well from contact with the ambient moisture, the present invention can be used to speed the complete polymerization or to overcome the effect of included inhibitors or retarders. In addition, the catalyst also provides flexibility, color stability and enhanced strength to thin film layers, even those which otherwise cure with adequate speed in the presence of ambient moisture. Further, these catalysts can be used to impart complete polymerization under otherwise poor polymerization conditions, such as in relatively dry ambient conditions where there may be insufficient ambient moisture to develop a full cure.

No particular quantitative thickness amount of the applied layer can be specified as denoting the boundary between a "thin film" and a "bulk layer," but the functional difference will be well known to those skilled in the art as exemplified by the discussion in the above-cited Millet reference at pages 259–260. Also as an example, the typical cyanoacrylate monomer layer applied to human nails by either the wearer or by another individual such as a beautician will be sufficiently thick to clearly have bulk polymerization properties as contrasted to the typical "thin film," which is exemplified by an adhesive layer which spreads between closely mating surfaces by capillary action.

Since the polymerization process of this invention can be used for in situ formation of artificial nail surfaces on a person's fingers or toes, it will be evident that it operates quite satisfactorily at ordinary ambient room temperatures. However, where it is used for other purposes where a person's comfort is not involved, it will be possible to vary the temperature somewhat above and below room temperature without significantly affecting the operability of the process. Those skilled in the art can readily determine the appropriate temperature range for any particular monomer and catalyst of interest.

Examples will illustrate typical applications of the present system. Considering first the use for production of artificial nail surfaces, one first applies a layer of cyanoacrylate monomer to the desired substrate, such as a fabric matrix (fiberglass, silk and linen are commonly used fabrics). The preferred monomer so applied may be a "slow" or inhibited monomer, a monomer with adequate polymerization speed but poor film flexibility, color stability or strength, or a monomer applied sufficiently thickly that it does not function as a "thin layer" which can be catalyzed simply by the moisture in the ambient air. After the monomer layer is applied, a short interval (commonly about 20–30 seconds) may be allowed to elapse to insure that the surface of the monomer layer will become stabilized by surface polymerization, although such delay is not required for satisfactory performance. The organotin compound may then be applied by dispensing the compound onto the surface of the cyanoacrylate layer, typically by use of an eyedropper or brush or by spraying (where proper control of vapors or mists can be maintained). The organotin compound is normally dispersed in a solvent in which the compound is soluble but which does not dissolve the cyanoacrylate surface coating. The solvent should be one such as acetone which vaporizes very quickly leaving the organotin compounds to be dispersed through the cyanoacrylate layer to rapidly initiate and complete the bulk polymerization of the layer. Preferred as solvents are 1,1,1,-trichloroethane, acetone, blends of acetone and 1,1,1-trichloroethane, other chlorinated solvents or hydrocarbon solvents.

Alternatively, one may use a brush-on system which allows the catalyst to be applied in greater amounts onto the surface and allows the user to physically blend the catalyst solution into the stabilized coating. In addition, a higher viscosity cyanoacrylate monomer can be used and some of or all of the organotin compound can be incorporated directly into the high viscosity monomer body.

It is also possible to use a combination of the two techniques, such that some of the cyanoacrylate monomer can be brushed on with some organotin compound present and the remainder of the organotin compound applied by the dropper method. The dropper method provides benefits such as preventing pitting of the polymer surface and avoiding any mist of catalyst material in the ambient air. It also eliminates the chance of cross contamination of the system. The brush-on system, on the other hand, offers the benefits of fully blending the additives into the curing monomer and to some extent increasing the physical properties of the coating.

As another alternative method of application, one may place the catalyst on a surface of one substrate and the monomer on a mating surface of that or another substrate. Mating of the two surfaces would then initiate the polymerization.

As another example, involving the formation of strong adhesive bonds (as for industrial, commercial or household adhesives, utilizes the same procedures as outlined above to produce thorough polymerization throughout the cyanoacrylate adhesive layer or for the formation of cyanoacrylate surfaces in industrial, commercial or household applications.

The amount of organotin compound required to catalyze cyanoacrylate monomer will typically be in the range of 0.1–3.0 parts (by weight), preferably 0.5–1.5, more preferably about 1.0 parts, of the compound per 100 parts of the cyanoacrylate monomer, although it is possible that higher or lower concentrations may be useful with some monomers. As an example, when considering the normal amount of coating placed on a human fingernail I have found that 1-2 drops of a solution of 0.5–1.0 grams of organotin compound dissolved in 100 ml of a blended acetone/1,1,1-trichloroethane solvent, as dispensed by a conventional hand held eyedropper, is quite satisfactory for complete polymerization (curing) of an artificial nail composition. The complete nail composition polymerizes thoroughly within about 1–5 seconds and it can thereafter be filed and/or have coatings such as nail polish applied.

It is possible to incorporate a variety of different kinds of additives into either or both of the original cyanoacrylate monomer layer prior to polymerization or into the solution containing the organotin compound. These include materials such as acrylic polymers to increase strength, flexibility, or moisture resistance, plasticizers to increase flexibility and impart crack arresting properties, ultra-violet radiation absorbers to inhibit yellowing from ultraviolet exposure, materials such as organofunctional silanes to modify the surface toward hydrophobicity and colorants to impart different hues to the polymer body. The individual amounts of each material to be present can be readily determined by those skilled in the art without any undue experimentation. It will be evident, of course, that any particular material, whether incorporated into the cyanoacrylate monomer layer or into the organotin solution, must not be such as to significantly impair the catalyzing properties of the organotin compound or to inhibit the cyanoacrylate monomer against polymerization catalyzed by the organotin compound.

A wide variety of beneficial properties and results have been observed by use of the present invention to catalyze the cyanoacrylate monomers. These include, but are not limited to, the absence of any violent uncontrolled exotherm upon polymerization; the absence of any degree of exotherm such as would impart damage or discomfort to a human nail surface or the underlying tissue, discolor or damage a transparent or translucent plastic surface or otherwise detrimentally affect any heat-sensitive surface to which the cyanoacrylate layer is applied as a coating or adhesive; lower shrinkage of the polymerized cyanoacrylate layer than is observed with moisture catalyzed systems or systems catalyzed with conventional prior art catalysts; lower stresses on the coating or adhesive bond, as a direct result of the lower shrinkage of the polymerized body; markedly lower degree of potential toxicity as compared to use of conventional prior art catalysts; lack of any significant absorption of the catalyst through the skin; and long-term stability of the organotin compound in solution in the solvent.

It will be evident from the above that there are many embodiments of this invention which those skilled in the art will recognize to be clearly within the scope and spirit of the invention even though not expressly stated above. The above description is therefore intended to be exemplary only and the full scope of the invention is to be defined solely by the appended claims.

I claim:

1. A method for the catalytic polymerization of cyanoacrylate monomer which consists essentially of contacting said monomer with a catalyst selected from the group of compounds having the formula $R_3SnX$ wherein each R is alkyl or aryl and X is alkyl, cycloalkyl, aryl, alkaryl, hydrogen, hydroxide or alkylcarboxyl or $R_2R'_2Sn$ wherein each R is alkyl and each R' is alkyl, cycloalkyl, aryl, alkaryl, hydrogen, hydroxide or alkylcarboxyl, and where if both R and R' are of the same chemical type, each of the R substituents is a different species from each of the R' substituents.

2. A method as in claim 1 wherein said organotin compound has the formula $R_3SnX$, where each R is alkyl or aryl and X is alkyl, cycloalkyl, aryl, alkaryl, hydrogen, hydroxide or alkylcarboxyl.

3. A method as in claim 2 wherein all R and X substituents are alkyl.

4. A method as in claim 3 wherein each said alkyl is a $C_1$–$C_{18}$ alkyl.

5. A method as in claim 4 wherein each said alkyl is a normal alkyl.

6. A method as in claim 5 wherein each said alkyl is n-octyl.

7. A method as in claim 1 wherein said organotin compound has the formula $R_2R'_2Sn$, where each R is alkyl and each R' is alkyl, cycloalkyl, aryl, alkaryl, hydrogen, hydroxide or alkylcarboxyl, and where if both R and R' are of the same chemical type, each of the R substituents is a different species from each of the R' substituents.

8. A method as in claim 7 wherein all R and R' substituents are alkyl.

9. A method as in claim 8 wherein each said alkyl is a $C_1$–$C_{18}$ alkyl.

10. A method as in claim 9 wherein each alkyl is a normal alkyl.

11. A method as in claim 8 wherein each said R alkyl is an n-$C_1$–$C_8$ alkyl and each said R' alkyl is an n-$C_9$–$C_{18}$ alkyl.

12. A method as in claim 11 wherein each said R alkyl is n-butyl and each said R' alkyl is n-lauryl.

13. A method as in claim wherein said cyanoacrylate monomer is the ethyl ester of 2-cyanoacrylic acid.

14. A method as in claim wherein said cyanoacrylate monomer is the methyl ester of 2-cyanoacrylic acid.

15. A method as in claim 1 wherein said organotin compound is present in a concentration of 0.1–3.0 parts by weight per 100 parts of the cyanoacrylate monomer.

16. A method as in claim 15 wherein said organotin compound is present in a concentration of 0.5–1.5 parts by weight per 100 parts of the cyanoacrylate monomer.

17. A method as in claim 16 wherein said organotin compound is present in a concentration of about 1.0 parts by weight per 100 parts of the cyanoacrylate monomer.

18. A method as in claim 1 wherein said organotin compound is reacted or complexed with a sulfur-containing compound.

19. A method as in claim 18 wherein said sulfur-containing compound is an acid salt or hydride.

20. A method as in claim 19 wherein said sulfur compound is a mercapto acid salt or mercaptide.

21. A polymerizable system consisting essentially of cyanoacrylate monomer and a catalyst selected from the group of organotin compounds having the formula $R_3SnX$ wherein each R is alkyl or aryl and X is alkyl, cycloalkyl, aryl, alkaryl, hydrogen, hydroxide or alkylcarboxyl or the formula $R_2R'_2Sn$ wherein each R is alkyl and each R' is alkyl, cycloalkyl, aryl, alkaryl, hydrogen, hydroxide or alkylcarboxyl, and where if both R and R' are of the same chemical type, each of the R substituents is a different species from each of the R' substituents, wherein upon contact of said monomer and said catalytic organotin compound, said compound catalyzes the polymerization of said monomer.

22. A system as in claim 21 wherein said organotin compound has the formula $R_3SnX$ (I), where each R is alkyl or aryl and X is alkyl, cycloalkyl, aryl, alkaryl, hydrogen, hydroxide or alkylcarboxyl.

23. A system as in claim 22 wherein all R and X substituents are alkyl.

24. A system as in claim 23 wherein each said alkyl is a $C_1$-$C_{18}$ alkyl.

25. A system as in claim 4 wherein each said alkyl is a normal alkyl.

26. A system as in claim 25 wherein each said alkyl is n-octyl.

27. A system as in claim 21 wherein said organotin compound has the formula $R_2R'_2Sn$, where each R is alkyl and each R' is alkyl, cycloalkyl, aryl, alkaryl, hydrogen, hydroxide or alkylcarboxyl, and where if both R and R' are of the same chemical type, each of the R substituents is a different species from each of the R' substituents.

28. A system as in claim 27 wherein all R and R' substituents are alkyl.

29. A system as in claim 28 wherein each said alkyl is a $C_1$-$C_{18}$ alkyl.

30. A system as in claim 29 wherein each said alkyl is a normal alkyl.

31. A system as in claim 30 wherein each said R alkyl is an n-$C_1$-$C_8$ alkyl and each said R' alkyl is an n-$C_9$-$C_{18}$ alkyl.

32. A system as in claim 31 wherein each said R alkyl is n-butyl and each said R' alkyl is n-lauryl.

33. A system as in claim 21 wherein said cyanoacrylate monomer is the ethyl ester of 2-cyanoacrylic acid.

34. A system as in claim 21 wherein said cyanoacrylate monomer is the methyl ester of 2-cyanoacrylic acid.

35. A system as in claim 21 further comprising at least one acrylic polymer, a plasticizer, an ultra-violet radiation absorber, an organofunctional silane or a colorant.

36. A system as in claim 21 wherein said organotin compound is present in a concentration of 0.1–3.0 parts by weight per 100 parts of the cyanoacrylate monomer.

37. A system as in claim 36 wherein said organotin compound is present in a concentration of 0.5–1.5 parts by weight per 100 parts of the cyanoacrylate monomer.

38. A system as in claim 37 wherein said organotin compound is present in a concentration of about 1.0 parts by weight per 100 parts of the cyanoacrylate monomer.

39. A system as in claim 21 wherein said organotin compound is reacted or complexed with a sulfur-containing compound.

40. A system as in claim 39 wherein said sulfur sulfur-containing compound is an acid salt or hydride.

41. A system as in claim 40 wherein said sulfur compound is a mercapto acid salt or mercaptide.

* * * * *

UNITED STATES PATENT AND TRADEMARK OFFICE
CERTIFICATE OF CORRECTION

PATENT NO. : 5,319,011
DATED : June 7, 1994
INVENTOR(S) : Douglas D. Schoon

It is certified that error appears in the above-indentified patent and that said Letters Patent is hereby corrected as shown below:

- COLUMN 8, CLAIM 13, LINE 46, AFTER "CLAIM" INSERT --1--;

CLAIM 14, LINE 48, AFTER "CLAIM" INSERT --1--;

AND

- COLUMN 9, CLAIM 22, LINE 14, DELETE "(I)".

Signed and Sealed this

Twenty-ninth Day of November, 1994

Attest:

*Bruce Lehman*

BRUCE LEHMAN

*Attesting Officer*  *Commissioner of Patents and Trademarks*